United States Patent
Liao et al.

(10) Patent No.: US 9,117,274 B2
(45) Date of Patent: Aug. 25, 2015

(54) SYSTEM AND METHOD FOR INTERACTIVE MARKERLESS PAPER DOCUMENTS IN 3D SPACE WITH MOBILE CAMERAS AND PROJECTORS

(75) Inventors: Chunyuan Liao, Mountain View, CA (US); Qiong Liu, Milpitas, CA (US); Jochen Huber, Darmstadt (DE)

(73) Assignee: FUJI XEROX CO., LTD., Tokyo (JP)

( * ) Notice: Subject to any disclaimer, the term of this patent is extended or adjusted under 35 U.S.C. 154(b) by 845 days.

(21) Appl. No.: 13/195,689

(22) Filed: Aug. 1, 2011

(65) Prior Publication Data

US 2013/0033484 A1 Feb. 7, 2013

(51) Int. Cl.
*G06T 15/00* (2011.01)
*G06T 7/00* (2006.01)
*G06T 7/20* (2006.01)
*H04N 9/31* (2006.01)
*G06F 3/01* (2006.01)

(52) U.S. Cl.
CPC .............. *G06T 7/0042* (2013.01); *G06F 3/017* (2013.01); *G06T 7/2033* (2013.01); *H04N 9/3179* (2013.01); *G06T 2207/10016* (2013.01); *G06T 2207/10024* (2013.01); *G06T 2207/10028* (2013.01); *G06T 2207/30176* (2013.01)

(58) Field of Classification Search
None
See application file for complete search history.

(56) References Cited

U.S. PATENT DOCUMENTS

| | | | |
|---|---|---|---|
| 2008/0158669 A1* | 7/2008 | O'Keefe et al. | 359/443 |
| 2009/0244309 A1* | 10/2009 | Maison et al. | 348/222.1 |
| 2010/0026960 A1* | 2/2010 | Sprague | 353/28 |
| 2010/0045705 A1* | 2/2010 | Vertegaal et al. | 345/661 |
| 2010/0315491 A1* | 12/2010 | Carter et al. | 348/51 |
| 2011/0288964 A1* | 11/2011 | Linder et al. | 705/27.1 |
| 2012/0212509 A1* | 8/2012 | Benko et al. | 345/633 |
| 2012/0293402 A1* | 11/2012 | Harrison et al. | 345/156 |

OTHER PUBLICATIONS

Micusik, Branislav, Horst Wildenauer, and Markus Vincze. "Towards detection of orthogonal planes in monocular images of indoor environments." Robotics and Automation, 2008. ICRA 2008. IEEE International Conference on. IEEE, 2008.*

David, Philip. Detecting planar surfaces in outdoor urban environments. No. ARL-TR-4599. Army Research Lab Adelphi MD Computational and Information Sciences Directorate, 2008.*

Bandyopadhyay, Deepak, et al., "Dynamic Shader Lamps: Painting on Movable Objects," Proceedings of IEEE ISMAR'01, pp. 207-216, 2001.

Bier, Eric, A., et al., "Toolglass and Magic Lenses: The See-Through Interface," Proceedings of SigGraph'93, pp. 73-80, 1993.

Song, Hyunyoung, et al., "MouseLight: Bimanual Interactions on Digital Paper Using a Pen and a Spatially-Aware Mobile Projector," Proceedings of CHI'10, Apr. 2010, pp. 1-10.

Wagner, Daniel, et al., "Pose Tracking from Natural Features on Mobile Phones," Proceedings of ISMAR'08, 2008.

(Continued)

*Primary Examiner* — Joni Richer
*Assistant Examiner* — Yi Wang
(74) *Attorney, Agent, or Firm* — Sughrue Mion, PLLC

(57) ABSTRACT

Systems and methods directed to fine-grained interaction with ordinary markerless paper documents and projectors at flexible poses in 3D space. Systems and methods allow for the projection of images onto non-flat variable surfaces by utilizing depth detection techniques in order to project an image or video properly onto a variable surface.

20 Claims, 11 Drawing Sheets

(1 of 11 Drawing Sheet(s) Filed in Color)

(56) References Cited

OTHER PUBLICATIONS

Wellner, Pierre David, "Interacting with paper on the Digital Desk," Communications of the ACM, Oct. 1993, pp. 1-107, vol. 36, No. 7.
Wilson, Andrew D., "Bringing Physics to the Surface," Proceedings of UIST'08, Oct. 2008, pp. 67-76.
Block, Florian, et al., "VoodooSketch-Extending Interactive Surfaces with Adaptable Interface Palettes," Proceedings of TEI'08, 2008, pp. 55-58.
Buxton, William S., Two-Handed Document Navigation, Xerox Disclosure Journal, 1994, pp. 103-108, vol. 19, No. 2.
Cao, Xiang, et al., "Interacting with Dynamically Defined Information Spaces using a Handheld Projector and a Pen," Proceedings of UIST'06, 2006, pp. 225-234.
Cao, Xiang, et al., "Multi-User Interaction using Handheld Projectors," Proceedings of UIST'07, 2007, pp. 43-52.
Do-Lenh, Son, et al., "Multi-Finger Interactions with Papers on Augmented Tabletops," Proceedings of TEI'09, Feb. 2009, pp. 267-274.
Everitt, Katherine M., et al., "DocuDesk: An Interactive Surface for Creating and Rehydrating Many-to-Many Linkages among Paper and Digital Documents," Proceedings of IEEE Tabletop'08, pp. 25-28, 2008.
Guiard, Yves, "Asymmetric Division of Labor in Human Skilled Bimanual Action: The Kinematic Chain as a Model," Journal of Motor Behaviour, 1987, pp. 486-517, vol. 19, No. 4.
Han, Jefferson Y., "Low-Cost Multi-Touch Sensing through Frustrated Total Internal Reflection," Proceedings of UIST'05, Oct. 2005, pp. 115-118.
Holman, David, et al., "PaperWindows: Interaction Techniques of Digital Paper," Proceedings of CHI'05, Apr. 2005, pp. 591-599.
Kane, Shaun K., et al., "Bonfire: A Nomadic System for Hybrid Laptop-Tabletop Interaction," Proceedings of UIST'09, Oct. 2009, pp. 129-138.
Khalilbeigi, Mohammadreza, et al., "Xpaaand: Interaction Techniques for Rollable Displays," Proceedings of ACM International Conference on Interactive Tabletops and Surfaces, May 2011, pp. 2729-2732.
Klemmer, Scott R., et al., "Books with Voices: Paper Transcripts as a Tangible Interface to Oral Histories," Proceedings of CHI'03, Apr. 2003, pp. 89-96.
Kovac, Jure, et al., "Human Skin Colour Clustering for Face Detection," Proceedings of International Conference on Computer as a Tool EUROCON'03, 2003.
Liu, Qiong, et al., "High Accuracy and Language Independent Document Retrieval with a Fast Invariant Transform," Proceedings of ICME'09, 2009.
Lowe, David G., "Distinctive Image Features from Scale-Invariant Keypoints," International Journal of Computer Vision, 2004, pp. 91-110, vol. 60, No. 2.
Mistry, Pranav, et al., "WUW-Wear Ur World-A Wearable Gestural Interface," Proceedings of CHI'09, Apr. 2009, pp. 4111-4116.
Newman, William, et al., "CamWorks: A Video-based Tool for Efficient Capture from Paper Source Documents," Proceedings of IEEE Multimedia System'99, 1999, pp. 647-653.
Raskar, Ramesh, et al., "RFIG Lamps: Interacting with a Self-Describing World via Photosensing Wireless Tags and Projectors," Proceedings of ACM SIGGRAPH'04, 2004, pp. 406-415.
Rekimoto, Jun, et al., "Augmented Surfaces: A Spatially Continuous Work Space for Hybrid Computing Environments," Proceedings of CHI'99, 1999, pp. 378-385.
Schoning, Johannes, et al., "Map Torchlight: A Mobile Augmented Reality Camera Projector Unit," Proceedings of CHI'09, Apr. 2009, pp. 3841-3846.
Sellen, Abigail, J., "The Myth of the Paperless Office," 1st ed., 2001, MIT Press.
Song, Hyunyoung, et al., "PenLight: Combining a Mobile Projector and a Digital Pen for Dynamic Visual Overlay," Proceedings of CHI'09, Apr. 2009, pp. 143-152.
Arai, Toshifumi, et al., "PaperLink: A Technique for Hyperlinking from Real Paper to Electronic Content," Proceedings of CHI'97, 1997, pp. 327-334.
Liao, Chunyuan, et al., "FACT: Fine-grained Cross-media Interaction with Documents via a Portable Hybrid Paper-Laptop Interface," Proceedings of MM'10, Oct. 2010, pp. 361-370.

* cited by examiner

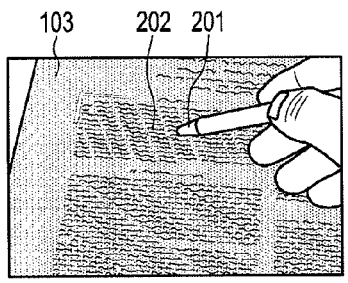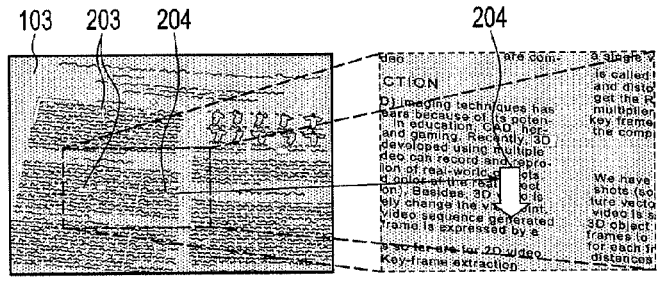
FIG. 2A  FIG. 2B  FIG. 2C

FIG. 8A 801
FIG. 8B 802
FIG. 8C 803
FIG. 8D 804
FIG. 8E 805
FIG. 8F 806
FIG. 8G 807
FIG. 8H 808

SYSTEM AND METHOD FOR INTERACTIVE MARKERLESS PAPER DOCUMENTS IN 3D SPACE WITH MOBILE CAMERAS AND PROJECTORS

BACKGROUND

1. Field of the Invention

The invention is generally directed to interactive camera/projector systems with paper documents, and more specifically, to interactive markerless paper documents in 3D space with cameras and projectors.

2. Description of the Related Art

Paper is still extensively used in conjunction with computers, because of its unique properties that existing computers cannot beat: it is comfortable to read and annotate, light to carry (to a degree), flexible to arrange in space and robust to use in various settings. However paper is inherently static, which limits its use for digital interaction. On the other hand, the field of mobile personal projections has advanced quickly in the last few years. Due to high portability, the mobile projectors can be situated in various settings in the real world, and augment physical objects such as paper with digital artifacts in an immersive way.

A system called FACT (Fine-grained And Cross-media interaction), described in U.S. application Ser. No. 12/857,497, filed on Aug. 16, 2010 and incorporated by reference herein, explores the marriage of paper and mobile projectors. FACT uses a camera-projector unit to recognize and augment markerless paper documents, and allows users to select fine-grained content on the paper for digital functions, such as keyword search, web search, multimedia annotation and so on. Nevertheless, FACT requires the paper documents to be placed on a fixed flat surface, which limits the inherent flexibility of paper and can downgrade the user experience.

FIG. 1 illustrates an implementation of FACT. FACT is an interactive paper system 100, of which the interface utilizes a small camera-projector unit 101, a laptop computer 102, and ordinary paper documents 103 without any barcodes or markers printed on the documents.

FIG. 2A to 2C illustrate an exemplary usage of FACT. FACT exploits the camera-projector unit for precise content-based image recognition and coordinate transform, allowing users to draw pen gestures to specify fine-grained paper document content (e.g. individual Latin words, symbols, icons, figures, and arbitrary user-chosen regions) for digital operations. For example, to find the occurrences of a word in a paper document, a user can point a pen tip 201 to the word 202 and issue a "Keyword Search" command as shown in FIG. 2A. As the result, all occurrences of that word on the paper are highlighted 203 by the projector as shown in FIG. 2B. FIG. 2C illustrates a close up view 204 of FIG. 2B which shows the word "3D" highlighted on the paper 103.

FACT features a natural feature-based physical-digital interaction mapping. In particular, Scale Invariant Feature Transform (SIFT)-like local natural features of a paper document are adopted to identify its digital version, and the feature correspondences are used to build precise homographic coordinate transforms between the camera, projector, and document reference frames. Moreover, a color based method is used to detect the pen tip in the camera view. The pen interactions on a hard copy are mapped to equivalent mouse pointer manipulations on the corresponding digital version. This approach does not require any special markers or modification of ordinary paper documents. In fact, the paper documents can be partially occluded, arbitrarily shifted and rotated on the table, which retains the spatial flexibility of paper.

However, the relative geometry of the camera, projector and the plane that paper document are in must remain unchanged during an interaction session. As the result, the paper documents must be put on a fixed flat table, and the camera-projector unit must be fastened at a certain location, such as the top of a desktop lamp. This causes inconvenience to users: FACT users cannot interact with a paper document that they hold in the air, and the interactive area on the table is limited (e.g. due to the small coverage of the mobile projector) and constant.

SUMMARY OF THE INVENTION

Aspects of the present invention include a system which may involve a camera system receiving three-dimensional orientation information for an identified surface; a projector projecting an image onto the identified surface; wherein the image is adjusted to be projected within the identified surface and oriented in accordance with the three-dimensional orientation information.

Aspects of the present invention further include a method, which may involve identifying a surface; utilizing a camera system to receive three-dimensional information for the identified surface; and projecting an image onto the identified surface, wherein the image is adjusted to fit within the identified surface and oriented in accordance with the three-dimensional orientation information.

Additional aspects of the present invention include a camera-projector unit, which may involve a camera system tracking an identified surface in real time and receiving three dimensional orientation information, the three dimensional orientation information including depth information; a projector projecting an image onto the identified surface; wherein the image is adjusted to be projected within the identified surface and oriented in accordance with the three-dimensional orientation information; wherein the camera detects changes to the surface in real time, and wherein the image is adjusted according to said changes in real time.

Additional aspects related to the invention will be set forth in part in the description which follows, and in part will be apparent from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and constitute a part of this specification exemplify embodiments of the present invention and, together with the description, serve to explain and illustrate principles of the inventive technique. Specifically:

FIG. 2A-2C illustrate an exemplary usage of FACT.

FIGS. 8A-8H illustrates exemplary features that can be utilized in conjunction with certain embodiments of the invention.

DETAILED DESCRIPTION OF THE INVENTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Certain embodiments of the application extend FACT in three aspects. First, they provide more spatial flexibility for interactive paper, by allowing users to hold and interact with paper documents in various poses in 3D space. Second, they support using a hand-held projector, instead of a fixed projector, to interact with paper from a wide range of angles and distance, and to cover a large interactive area. Lastly, by taking advantage of the flexible placement of interactive paper and projectors, they enable bi-manual paper-projector interaction, in that the user can manipulate the paper document and the projector simultaneously. To enable such novel interaction, embodiments of the invention utilize a novel method combining regular RGB images and depth images for robust recognition and tracking of surfaces such as paper documents, along with finger gestures, which in return enables FACT-like interaction with fine-grained document content in 3D space.

Presently, no existing system supports fine-grained interaction with ordinary markerless paper documents and projectors at flexible poses in 3D space, let alone any advanced bi-manual paper-projector interaction. No existing system supports the tracking of flexible surfaces, along with the ability to project within and along the surfaces based on the shape, orientation and depth of the surfaces from the camera.

To overcome the aforementioned limitations of FACT and explore more flexible mixed-media interaction, certain embodiments of the system can detect, in real time, the 3D pose of a paper document relative to the camera-projector unit. This enables an array of novel interactions, including manipulating paper documents in the air, moving the camera-projector unit in an open space and operating the paper and camera-projector unit at the same time.

Figure 1:
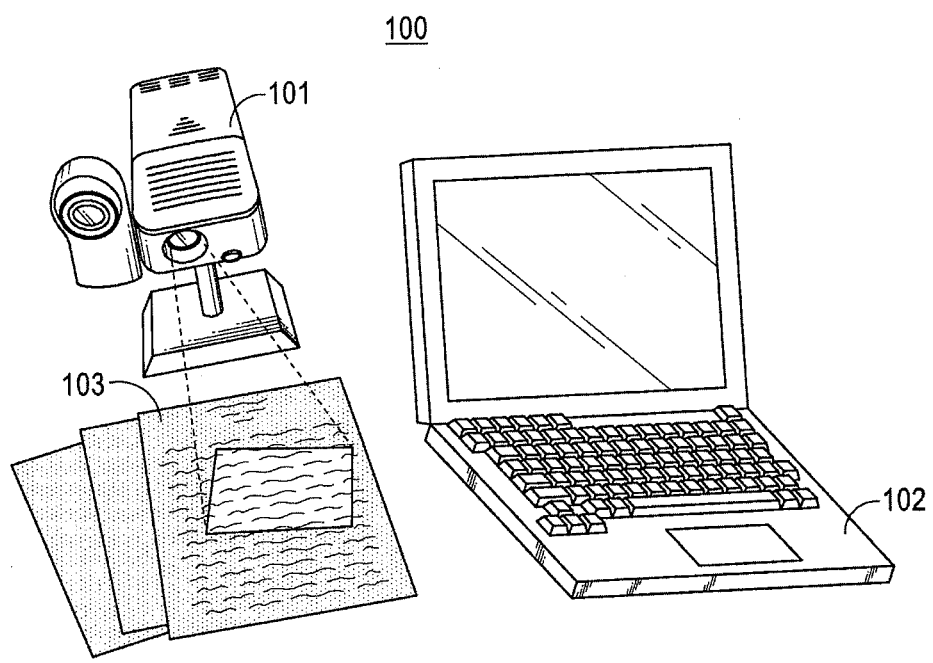
FIG. 1 illustrates an implementation of FACT.
Figure 3A:
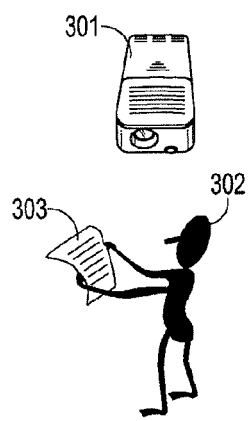
FIG. 3A-3C illustrate exemplary usages of implementations of certain embodiments of the invention.
Figure 3B:
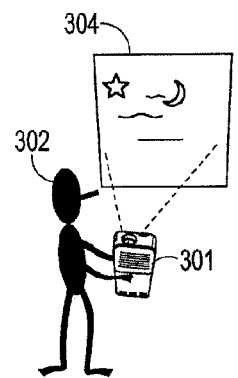
Figure 3C:
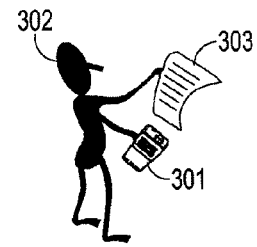

In particular, the certain embodiments of the system support three typical interaction styles as illustrated in FIG. 3A to 3C. First, the camera-projector unit 301 can be mounted at a fixed place, and a user 302 can use two hands to freely hold, move, point or mark paper documents 303 on a table or in the air with various poses as shown in FIG. 3A. Second, the user 302 can hold the camera-projector unit 301 in one hand and point it to an area 304 in her workspace, and then interact with that area though projector—or body—gestures, without movement of the projection surface as shown in FIG. 3B. Third, the user 302 can hold a paper document 303 in one hand and the camera-projector unit 301 in the other hand, and then coordinate the paper and the unit for bi-manual interaction FIG. 3C.

The following major building blocks are used to support the five interaction styles: (1) recognition and pose estimation of flexible surfaces such as markerless paper documents in 3D space, (2) finger gestures to manipulate paper document content, (3) body gestures to interact with the mixed-media environment, (4) handheld projector-based interaction, and (5) bi-manual interactions. In the following description, the design of modules and certain supporting techniques are presented.

The present system captures video frames via a camera, and unitizes local natural features (e.g. SIFT or Feature Integration Theory (FIT)) to identify surfaces such as ordinary paper documents without any special markers. Present implementations of embodiments of the invention can operate at ~0.5 fps for recognizing a frame of 640*480 pixels on a PC with a quad-core 2.82 GHz CPU and 4 GB RAM. Considering the fact that users usually do not change documents very quickly during their tasks, this recognition speed is acceptable for practical use.

It is possible to exploit the feature correspondence between one single color video frame and the known document model to recognize and estimate the 3D pose of a paper document. However using only the visual feature information (such as color information) in the video frames exclusively for this purpose faces several difficulties:

1. The current recognition algorithm does not tolerate much perspective distortion of the document images (e.g. up to ~30 tilting degrees), which actually happens quite often when the paper documents are held in the air for reading and manipulation.

2. The projection on paper may interfere with the original natural features of the document, and results in failure in recognition and pose estimation. This situation is even worse when the paper document has little content, thereby containing few natural features. Although the paper pose could still be calculated by detecting the corners of the paper from the color images, this method requires high contrast between the paper and background.

3. Due to the high computational complexity, feature extraction might not be performed in real time, which makes it difficult to estimate paper 3D poses fast enough to catch up with the user interaction.

In response to these issues, scene depth information, which, for example, can be obtained from a MICROSOFT KINECT, is exploited to complement the color images for more robust paper document recognition and tracking, hence more flexibility of interaction in 3D space. In particular, the system attempts to obtain the depth image of the scene, from which it can derive the 3D pose of a flat paper document and address the above issues.

1. The pose information can be used to "rectify" the color images for less perspective distortion, before they are passed to the recognition module. Therefore, the proposed system effectively expands the scope of the paper spatial flexibility in 3D space.

2. The 3D pose estimation uses only the depth image, which has nothing to do with the document natural features. Thus the proposed system is robust to insufficient feature correspondence, and support a wider range of document content. For example, one can fill a piece of blank paper with a projected video clip and move it around in space.

3. Obtaining the depth image and deriving the paper 3D pose from the depth image can be conducted in real time (~60 fps). The pose estimation and the document recognition can be carried out in two separate threads, each updating the "world" model asynchronously. Therefore, from the aspect of the users, the proposed system is able to locate specific document content in 3D space in real time.

Figure 4:
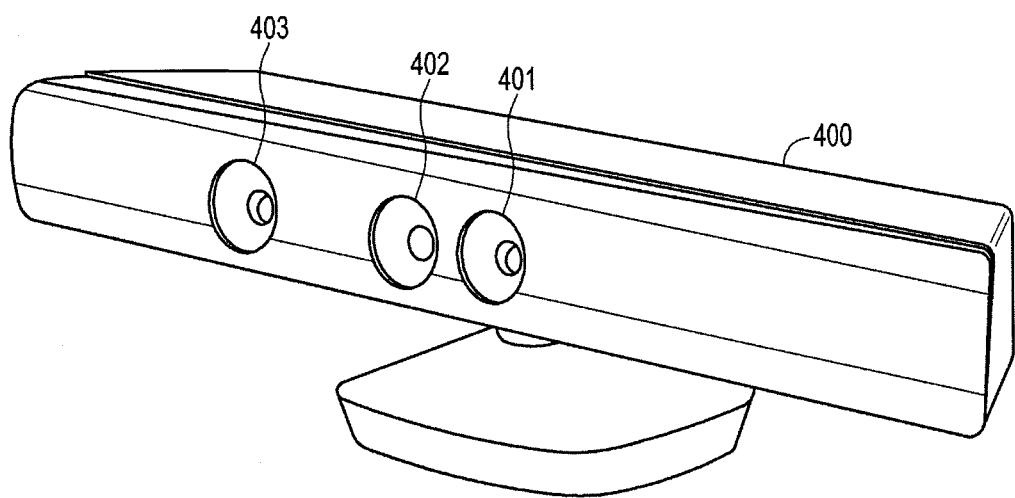
FIG. 4 illustrates an example camera system that can be utilized with the camera-projector apparatus in accordance with certain embodiments of the invention.

Embodiments of the invention can be integrated into or be in tandem with a camera system 400 that can involve a depth-sensing range camera, an infrared structured light source and a regular RGB color camera, as shown in the camera system 400 of FIG. 4. The depth-sensing camera 401 (called a depth camera thereafter) can approximate distances of objects by continuously projecting and interpreting reflected results from the structured infrared light source 403. The depth camera yields a so-called depth image, which is precisely aligned with the images captured by the RGB camera 402 to create a color image, where each color indicating an estimated depth. Thus embodiments of the invention can determine the depth of each pixel in the color images, establish a three-dimensional coordinate system with respect to the RGB camera, and transform each coordinate into real world coordinates. The RGB camera may also be utilized to identify content or features of an identified surface, so that when gestures are made, the RGB camera can detect the gestures within the identified surface with respect to the identified content.

Figure 5:
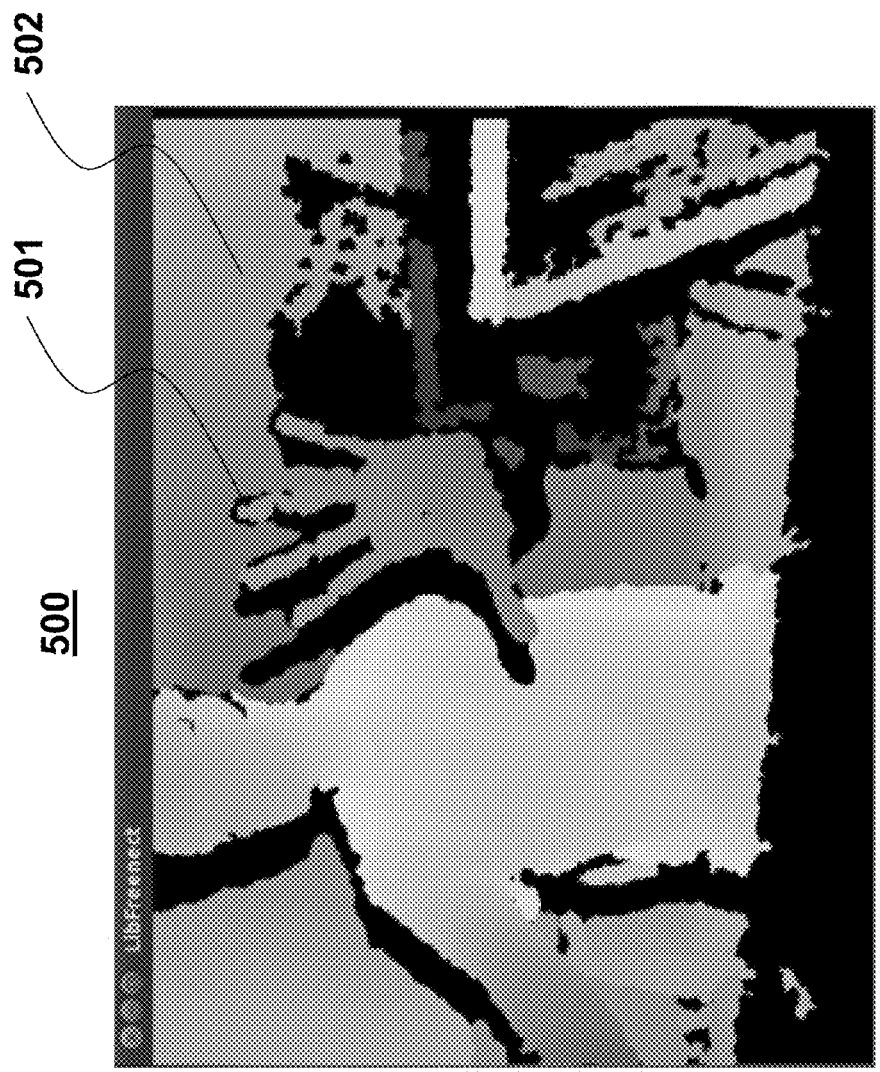
FIG. 5 illustrates an example depth image in accordance with certain embodiments of the invention.

FIG. 5 illustrates an example of combining a depth image and images from the RGB camera to produce the color image 500. Each color represents a visualization of the estimated depth from the RGB camera for various surfaces. In the example shown in FIG. 5, the proximity of the identified surfaces to the RGB camera is indicated by a sliding scale from red to blue. For example, the identified red surface 501 is closer to the RGB camera than the background, which is color coded as blue 502.

Figure 6:
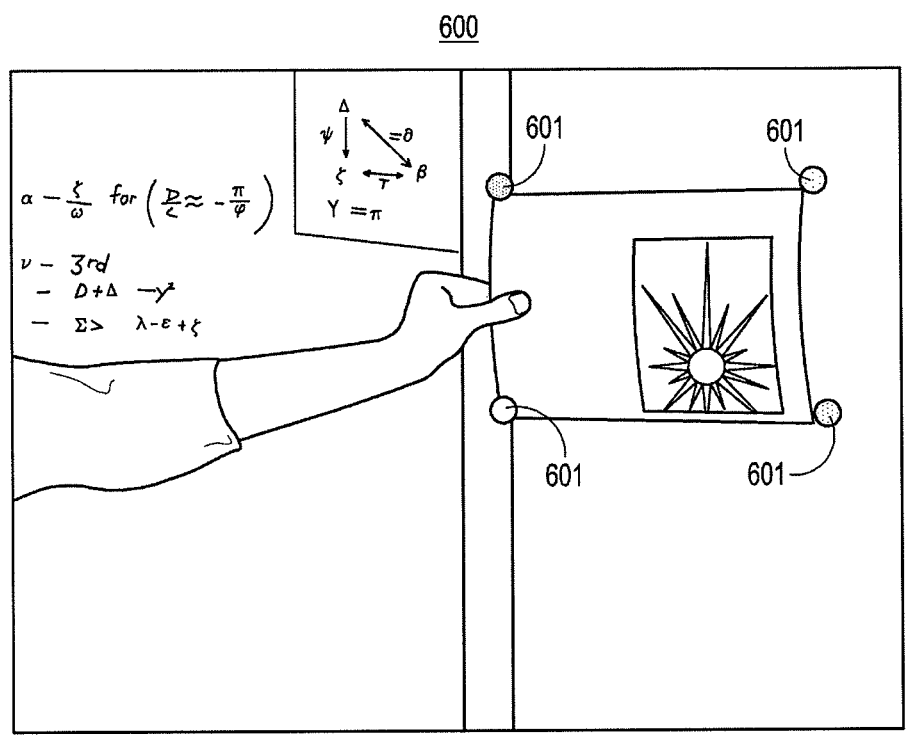
FIG. 6 illustrates an example image from a camera from which a depth image is derived in accordance with certain embodiments of the invention.
Figure 7:
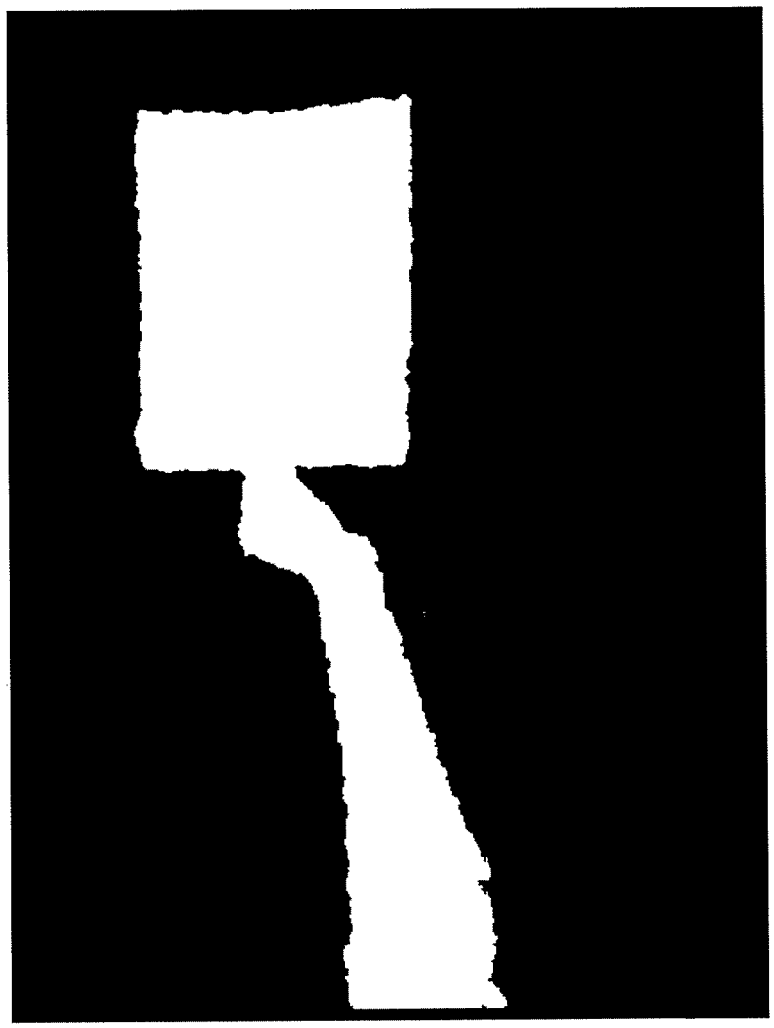
FIG. 7 illustrates an exemplary binarized depth image in accordance with certain embodiments of the invention.

Although non-planar cases can be tracked by the proposed system, the planar case (e.g. flat paper) is assumed for initialization, which can be modeled as a 2D plane in the 3D space. With this assumption, certain embodiments of the system detect and identify a surface (e.g. four corners of a piece of paper) to track it. For example an image 600 shown in FIG. 6, depicts a sheet of paper held in the air by a user. The sheet of paper has four corners (indicated by circles 601) to be detected. Note that the circles utilized to illustrate the location of the four corners are for illustrative purposes and not required for certain embodiments to detect the corners. Considering the possibly varying lighting conditions, certain embodiments of the system utilize the depth image for corner detection for higher robustness. First, a threshold is applied to the depth image to filter out any background objects. FIG. 7 shows the depth image after a depth threshold and a so-called blob detection has been applied 700. The blob detection basically recognizes objects in the scene of a certain size and applies a binary threshold to the image. In this case, the depth threshold was set to filter out the background objects of FIG. 6, and the blob-detection detected an object (here: a piece of paper) and an arm holding the object, which remain in the depth image 700.

This depth image 700 serves as the input image for the corner detection algorithm. The objective is to robustly determine the corners of the target object (here again the piece of paper). The algorithm contains three steps:

1. Breaking up weakly-connected components: the objective of this step is to detect weak connections between objects in the image and eliminate them to finally isolate each of the objects. A weak connection is a thin line in the input image, connecting larger areas in the image (e.g. the piece of paper and the arm as shown in FIG. 7). This is done with three basic image operations. The image is first blurred heavily, which results in lower gray-color values for the connections. Then a binary threshold is applied, eliminating the blurred borders. Finally, morphological open and close operators are applied to concretize the object borders.

2. Detecting inner points of the target object: the resulting image of step 1 contains the isolated object. However, due to the image operations, the area and consequently the contour have been reduced. Nevertheless, a further blob detection now enables the detection of the reduced area. Then, a rotation invariant bounding rectangle of minimum area is calculated. The corner points of this bounding rectangle serve as the input points for the next step.

3. Mapping inner to original corner points: the inner corner points are finally mapped to the original object corners by considering the contour of the objects recognized in FIG. 6. The bounding rectangle (and thus the inner corner points) is iteratively expanded to approach the corners of the original target object. Once the distance is smaller than a certain threshold, the corners have been found.

The corners are then tracked on a frame basis by reasoning about the orientation of the target object as found in step 2 of the algorithm through the rotation invariant bounding rectangle. Thus, images can be projected within the area of the identified tracked surface, and displayed based on the orientation of the surface in real time.

Once a paper document is correctly recognized and tracked in 3D, the proposed system allows users to interact with it through finger gestures. For example, a user can use her index finger to point to a figure on the paper to redirect it to a nearby public display, or draw a lasso around a region in a map to query hotels in that area. Two techniques to support the finger gestures are pointing detection and touch detection.

Pointing detection could be done by using color images only, via, for example, the RGB camera. For instance, a skin color model can be applied to detect and track the tip of a user finger or a pen, with the assumption that the skin color is distinguishable from the background. For finger tip detection, a fixed color model can be adopted for skin color detection; for pen tip detection, a pre-captured pen tip image for Hue histogram back-projection can be used.

Of course, this fixed color model-based detection may suffer from varying lighting conditions. This may be relieved by incorporating the depth images. Since hands usually have different depth from the identified surface such as a held paper, embodiments of the invention can identify the hand region in the depth image, and then use the corresponding region in the color image to build a color model on the fly, which can address the issue of unstable lighting.

Previously, it was difficult to detect touching with only one regular color webcam, but with the depth information of the finger and identified surface ascertained, it is relative easy for the proposed system to detect whether or not the finger is touching the identified surface. Given the location of a finger tip and the boundary of the pointed surface in a depth image, embodiments of the invention can select, around the finger tip, three points that fall on the identified surface to model a plane. By calculating the distance between the detected finger tip and the plane, it can be checked if the finger has touched the identified surface.

With the detected finger tip and a recognized document, embodiments of the invention can also readily determine the pointed document content and re-use the original FACT gestures for users to select specific content on paper for digital operations. Various possible gestures, as illustrated in FIG. 8A to 8H, include Pointer 801, Underline 802, Bracket 803, Vertical Bar 804, Lasso 805, Marquee 806, Path 807 and Freeform 808 annotations. After selecting the document content, the user can use other gestures such as marking menus to specify a command to be applied to the content, in a way similar to FACT.

The interactive paper can be integrated with other interactive paper and/or devices (e.g. displays and printers) to form a mixed-media workspace, in which the paper and devices are put on the equal footing in terms of digital interaction. The user can use body gesturers to perform cross-device interaction, such as copying sketches on scratch paper to a nearby public display for discussion, linking a figure in a book to slides shown on the display, or "forward" a printout to a printer to make one more copy for her colleague.

Although the concept of mixed-media environment is known, certain embodiments of the system are distinguished from conventional systems by supporting the manipulation of an ordinary markerless paper document in 3D space via portable hardware settings.

Given the dynamic relative geometry between paper (more generally projection surfaces) and the camera-projector unit, certain embodiments of the system further support another different user scenario where the identified tracked surfaces are fixed paper documents (e.g. being on a flat table or a wall), whereas the unit is moved in 3D space by the user.

This feature can significantly advance the user experience. First of all this feature allows users to easily interact with a space that is much larger than the coverage of an existing FACT camera-projector unit. A user can treat the unit like a "flashlight", pointing it to various paper documents and revealing associated digital information. This is an important step toward a ubiquitous computing environment where physical objects at any places, such as normal paper documents, can be easily augmented and interacted with.

Second, the users can hold the camera-projector unit at different distance and from various angles while interacting with surfaces, which opens the door of projector-based gestures to manipulate document content. For instance, a user can point the unit to a map hung on a wall. Guided by a cursor projected on the map, the user moves the unit in the air to draw a lasso gesture to select a specific region and queries nearby hotels. As the result, the found hotels are highlighted on the map by the projector.

Similar projector-based gestures have been attempted before, but the existing systems utilize special markers on the projection surface and/or the projector. In contrast, certain embodiments of the system do not have such constraints, and thus can be more practical.

Figure 9A:
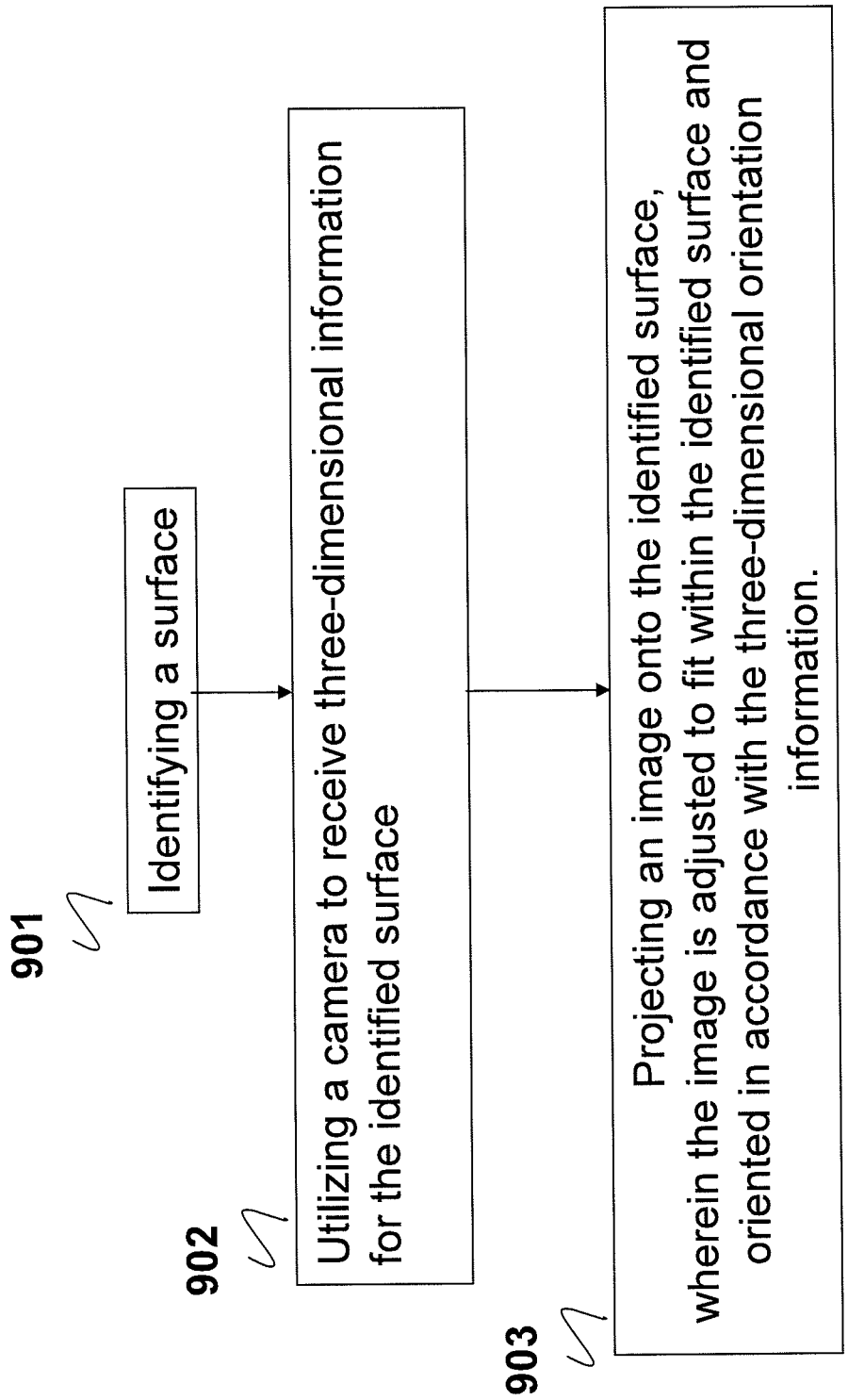
FIGS. 9A and 9B illustrates exemplary flowcharts according to certain embodiments of the invention.

FIG. 9A illustrates an exemplary flowchart according to embodiments of the invention. First a surface is identified 901 for tracking and projecting purposes. Next a camera, such as a depth camera is utilized to receive three-dimensional information for the identified surface 902, such as depth, shape, orientation etc. From the information, an image can then be projected onto the identified surface, wherein the image is adjusted to fit within the identified surface and oriented in accordance with the three-dimensional orientation information 903.

Figure 9B:
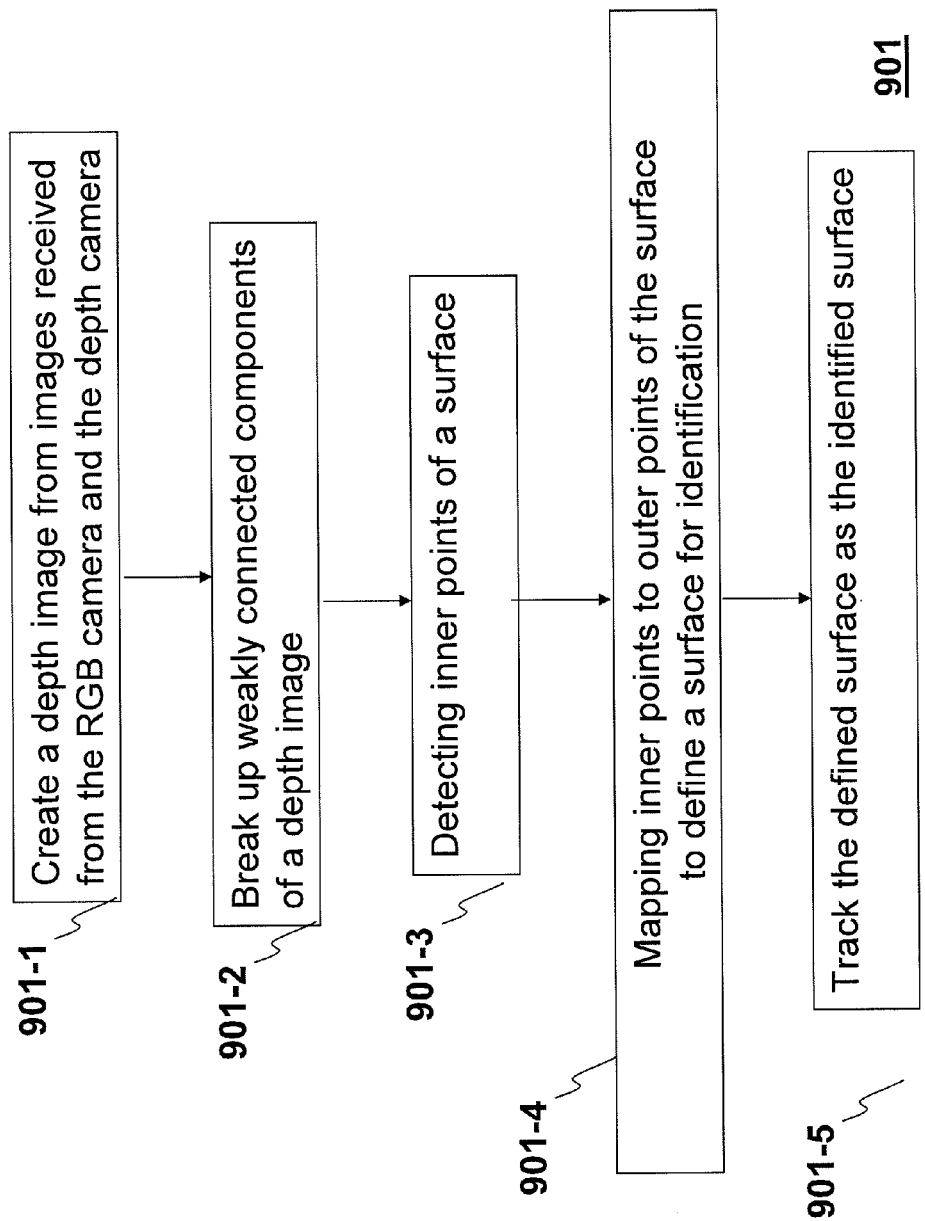

FIG. 9B illustrates an exemplary flowchart for identifying the surface 901. First, a depth image is created based on images received from the depth camera 901-1. Next, the depth image is analyzed for weakly connected components, wherein those weakly connected components are broken up to isolate potential surfaces 901-2. Then, the inner points of a potential surface are determined 901-3. The inner points are mapped to outer points of a potential surface to define a surface for identification 901-4. The defined surface is used as the identified surface and tracked 901-5. The outer points can be defined as four corner points (to indicate a potential piece of paper), or as other pre-set identifying attributes for identifying particular types of desired surfaces.

Figure 10:
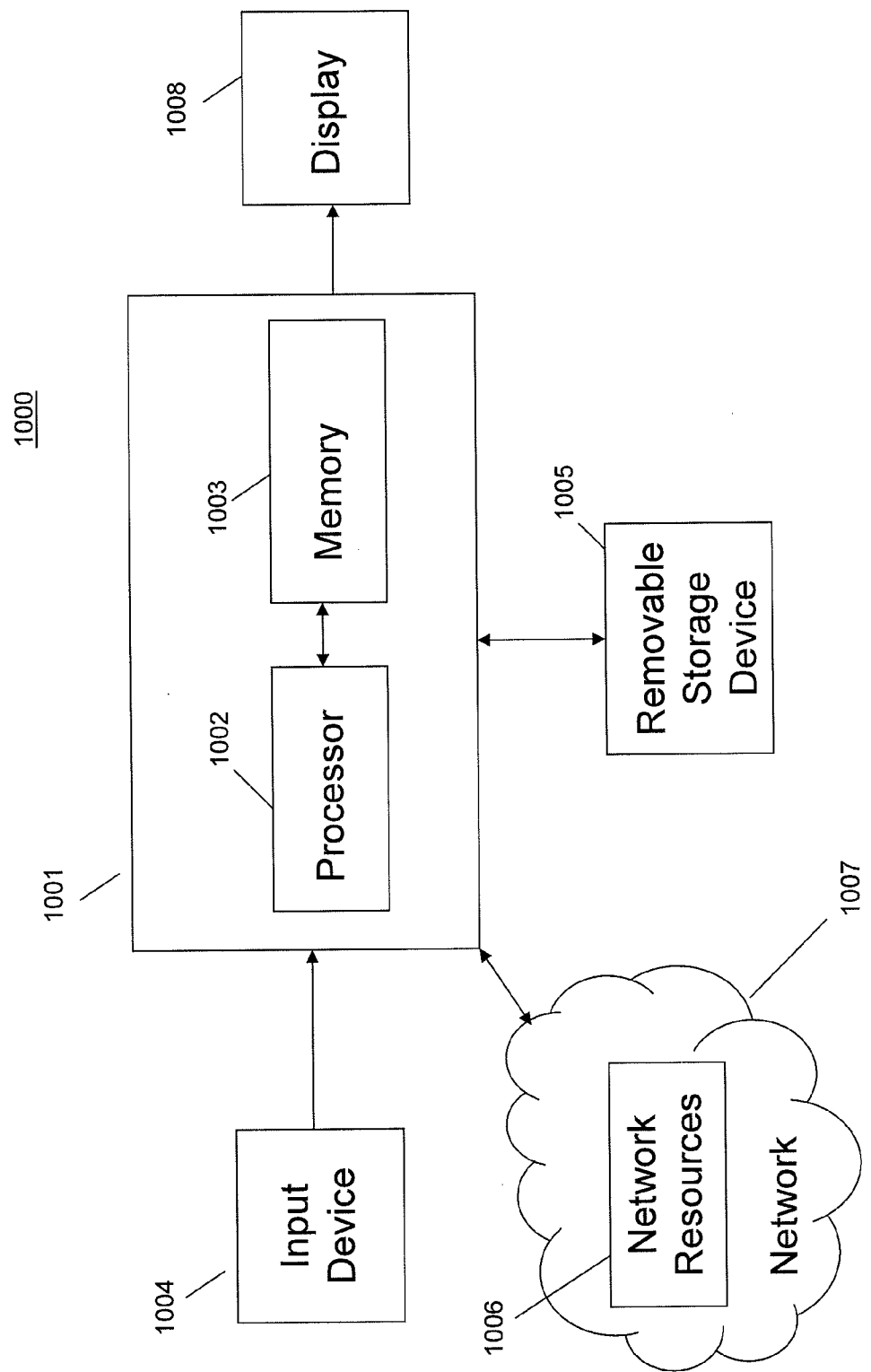
FIG. 10 illustrates an exemplary computer platform on which certain embodiments of the invention may be implemented.

FIG. 10 is a block diagram that illustrates an embodiment of a computer/server system 1000 upon which an embodiment of the inventive methodology may be implemented. The system 1000 includes a computer/server platform 1001 including a processor 1002 and memory 1003 which operate to execute instructions, as known to one of skill in the art. The term "computer-readable medium" as used herein refers to any medium that participates in providing instructions to processor 1002 for execution. Additionally, the computer platform 1001 receives input from a plurality of input devices 1004, such as a keyboard, mouse, touch device or verbal command. The computer platform 1001 may additionally be connected to a removable storage device 1005, such as a portable hard drive, optical media (CD or DVD), disk media or any other medium from which a computer can read executable code. The computer platform may further be connected to network resources 1006 which connect to the Internet or other components of a local public or private network. The network resources 1006 may provide instructions and data to the computer platform from a remote location on a network 1007. The connections to the network resources 1006 may be via wireless protocols, such as the 802.11 standards, Bluetooth® or cellular protocols, or via physical transmission media, such as cables or fiber optics. The network resources may include storage devices for storing data and executable instructions at a location separate from the computer platform 1001. The computer interacts with a display 1008 to output data and other information to a user, as well as to request additional instructions and input from the user. The display 1008 may therefore further act as an input device 1004 for interacting with a user.

Moreover, other implementations of the invention will be apparent to those skilled in the art from consideration of the specification and practice of the invention disclosed herein. Various aspects and/or components of the described embodiments may be used singly or in any combination in certain embodiments of the system. It is intended that the specification and examples be considered as exemplary only, with a true scope and spirit of the invention being indicated by the following claims.

What is claimed is:
1. A system, comprising:
  a camera system configured to detect three-dimensional orientation information for an identified surface onto which an image is to be projected, the three-dimensional orientation information comprising information about an angle of the identified surface, an orientation of the identified surface and a shape of the identified surface;

at least one projector configured to project the image onto the identified surface, and to adjust the image to be projected within the identified surface and oriented in accordance with the information about the angle of the identified surface, the orientation of the identified surface and the shape of the identified surface, wherein the identified surface comprises a marker-less surface, and wherein the camera system is configured to detect the identified surface by creating a depth image based on images received from the camera, analyzing the depth image for weakly connected components to isolate potential surfaces, determining inner points of one of said potential surfaces, mapping the inner points to outer points of the one of said potential surfaces to define a surface, the outer points being determined based on preset attributes for a desired surface, and tracking the defined surface as the identified surface.

2. The system of claim 1, wherein the three-dimensional orientation information comprises depth information.

3. The system of claim 2, further comprising an infrared light source projecting an infrared light onto the identified surface; wherein the camera system comprises a depth-sensing camera receiving depth information by recording infrared light reflected from the surface.

4. The system of claim 3, wherein the camera system comprises a RGB camera capturing visual feature information of a plurality of surfaces, wherein the visual feature information is used to identify content on the identified surface.

5. The system of claim 4, wherein the system detects gestures from a user.

6. The system of claim 1, wherein the camera system detects changes to the surface in real time, and wherein the image is adjusted according to said changes in real time.

7. The system of claim 1, wherein the identified surface comprises a flexible surface.

8. The system of claim 1, wherein the projector is configured to project onto the identified surface from a plurality of angles and a plurality of distances.

9. The system of claim 8, wherein the projector and the identified surface are configured to be manipulated simultaneously.

10. A method, comprising:

identifying a surface;

utilizing a camera system to receive three-dimensional orientation information for the identified surface onto which an image is to be projected, the three dimensional orientation information comprising information about an angle of the identified surface, an orientation of the identified surface and a shape of the identified surface; and projecting the image onto the identified surface and adjusting the image to fit within the identified surface and oriented in accordance with the information about the angle of the identified surface, the orientation of the identified surface and the shape of the identified surface, wherein the identified surface comprises a marker-less surface, and wherein, in utilizing the camera system, the camera system detects the identified surface by creating a depth image based on images received from the camera, analyzing the depth image for weakly connected components to isolate potential surfaces, determining inner points of one of said potential surfaces, mapping the inner points to outer points of the one of said potential surfaces to define a surface, the outer points being determined based on preset attributes for a desired surface, and tracking the defined surface as the identified surface.

11. The method of claim 10, wherein the three-dimensional orientation information comprises depth information.

12. The method of claim 11, further comprising projecting an infrared light onto the identified surface; and receiving depth information by recording infrared light reflected from the surface.

13. The method of claim 12, wherein utilizing the camera system further comprises utilizing a RGB camera to capture visual feature information from a plurality of surfaces, and utilizing the visual feature information to identify content on the identified surface.

14. The method of claim 13, further comprising detecting gestures from a user.

15. The method of claim 10, further comprising detecting changes in the surface in real time, and adjusting the image according to said changes in real time.

16. A camera-projector unit, comprising:

a camera system configured to track an identified surface in real time and receive three dimensional orientation information, the three dimensional orientation information comprising information about an angle of the identified surface, an orientation of the identified surface onto which an image is to be projected, a shape of the identified surface and a depth of the identified surface;

a projector configured to project the image onto the identified surface and adjust the image to be projected within the identified surface and oriented in accordance with the information about the angle of the identified surface, the orientation of the identified surface, the shape of the identified surface and the depth of the identified surface;

wherein the camera system detects changes to the surface in real time, and wherein the image is adjusted according to said changes in real time, and wherein the identified surface comprises a marker-less surface, and wherein the identified surface is determined by a process comprising:

creating a depth image based on images received from the camera;

analyzing the depth image for weakly connected components to isolate potential surfaces;

determining inner points of one of said potential surfaces;

mapping the inner points to outer points of the one of said potential surfaces to define a surface, the outer points determined based on preset attributes for a desired surface; and tracking the defined surface as the identified surface.

17. The camera-projector unit of claim 16, wherein the camera system further comprises a RGB camera capturing visual feature information from a plurality of surfaces, wherein the visual feature information is utilized to identify content within the identified surface.

18. The camera-projector unit of claim 17, wherein the camera system detects gestures from a user within the identified surface.

19. The camera-projector unit of claim 18, wherein the depth information is utilized to detect a touch from the user within the identified surface.

20. The camera-projector unit of claim 16, wherein an infrared light is sent to the identified surface, and wherein the three dimensional orientation information is obtained based on reflections of the infrared light from the identified surface.

* * * * *